(12) United States Patent
Baughman et al.

(10) Patent No.: US 9,734,036 B2
(45) Date of Patent: Aug. 15, 2017

(54) OPTIMIZING A CLOUD-COMPUTING ENVIRONMENT

(71) Applicant: International Business Machines Corporation, Armonk, NY (US)

(72) Inventors: Aaron K. Baughman, Silver Spring, MD (US); Thomas B. Harrison, Holly Springs, NC (US); Cody A. Clements, Clifton Springfield, MO (US); Michael P. Lazos, Manchester, NH (US); Robert J. Lewis, Chapel Hill, NC (US); Brian M. O'Connell, Cary, NC (US); Mary C. Zabriskie, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 14/458,403

(22) Filed: Aug. 13, 2014

(65) Prior Publication Data
US 2016/0050108 A1    Feb. 18, 2016

(51) Int. Cl.
*G06F 9/455*    (2006.01)
*G06F 11/34*    (2006.01)
(Continued)

(52) U.S. Cl.
CPC ........ *G06F 11/3457* (2013.01); *G06F 9/5072* (2013.01); *H04L 41/083* (2013.01); *H04L 43/50* (2013.01)

(58) Field of Classification Search
CPC .. G06F 9/455; G06F 11/3457; G06F 11/3447; H04L 43/10
See application file for complete search history.

(56) References Cited

U.S. PATENT DOCUMENTS

2009/0300423 A1* 12/2009 Ferris ................... G06F 11/36
                                              714/38.1
2010/0198960 A1*  8/2010 Kirschnick ........ G06F 11/3414
                                              709/224
(Continued)

OTHER PUBLICATIONS

Verissimo et al., E-biobanking: What Have you Done to My Cell Samples? Nov./Dec. 2013, Copublished by the IEEE Computer and Reliability Societies, 1540-7993/13, copyright.
(Continued)

*Primary Examiner* — Brian W Wathen
(74) *Attorney, Agent, or Firm* — Schmeiser, Olsen & Watts, LLP; Michael A. Petrocelli

(57) ABSTRACT

A method and associated systems for optimizing a computing platform. A processor joins sets of configurable parameters into groups that each identifies a configuration of the computing environment or of a component or subsystem of the computing environment. The processor generates a set of variations of each group, where each variation identifies a candidate configuration of the component, subsystem, or platform, and where each candidate configuration identifies a distinct set of values of the group of parameters associated with that component, subsystem, or platform. Each configuration of this first generation of configurations undergoes a massively parallel iterative procedure that generates a next generation of configurations by performing operations upon the first generation that are similar to those of a natural-selection process. The procedure repeats until successive generations converge, within resource constraints, to a fittest generation that represents an optimal or most nearly optimal configuration of the computing platform.

20 Claims, 5 Drawing Sheets

(51) Int. Cl.
H04L 12/24 (2006.01)
G06F 9/50 (2006.01)
H04L 12/26 (2006.01)

(56) References Cited

U.S. PATENT DOCUMENTS

| | | | | |
|---|---|---|---|---|
| 2013/0019242 | A1* | 1/2013 | Chen | H04L 41/145 718/1 |
| 2014/0026122 | A1* | 1/2014 | Markande | G06F 11/3688 717/124 |
| 2014/0068053 | A1* | 3/2014 | Ravi | G06F 9/5072 709/224 |
| 2015/0082094 | A1* | 3/2015 | Li | G06F 11/3688 714/32 |

OTHER PUBLICATIONS

Abbasy et al., Enabling Data Hiding for Resource Sharing in Cloud Computing Environments Based on DNA Sequences, 2011 IEEE World Congress on Services, 978-0-7695-4461-8/11, DOI: 10.1109/Services.2011.45, pp. 385-390.

Alsairafi et al., The Design of Discovery Net: Towards Open Grid Services for Knowledge Discovery, The International Journal of High Performance Computing Applications, vol. 17, No. 3, Fall 2003, pp. 297-315.

Doddavula, et al., Implementation of a Secure Genome Sequence Search Platform on Public Cloud, Leveraging Open Source Solutions, 2011 Third IEEE International Conference on Cloud Computing Technology and Science, 978-0-7695-4622-3/11, DOI: 10.1109/CloudCom.2011.36, pp. 205-212.

Evani et al., Enabling Atlas2 Personal Genome Analysis on the Cloud, 2011 IEEE International Workshop on Genomic Signal Processing and Statistics, Dec. 4-6, 2011, San Antonio, TX USA, 978-1-4673-0490-1111, pp. 117-120.

Greer, Jr. et al., Synthetic Biology Driven by Harnessing Forces of Disruptive Innovation, SocialCom/PASSAT/BigData/EconCom/BioMedCom 2013, 978-0-7695-5137-1/13 copyright 2013 IEEE DOI 10.1109/SocialCom.2013.126, pp. 840-845.

Gunarathne et al., Cloud Computing Paradigms for Pleasingly Parallel Biomedical Applications, HPDC'10, Jun. 20-25, 2010, Chicago, Illinois, USA, Copyright 2010 ACM 978-1-60558-942-8/10/06, pp. 460-469.

Moretti et al., A Framework for Scalable Genome Assembly on Clusters, Clouds, and Grids, IEEE Transactions on Parallel and Distributed Systems, vol. 23, No. 12, Dec. 2012, pp. 2189-2197.

Talukder et al., Cloud-MAQ: The Cloud-enabled Scalable Whole Genome Reference Assembly Application, 978-1-4244-7202-4/10 copyright 2010 IEEE, 5 pages.

Hellerstein et al., Science in the Cloud: Accelerating Discovery in the 21st Century, Feb. 17, 2012, 8 pages.

Liu et al., A DCaaS Model of DNA Computing for Solving a Class of Nonlinear Problems, Q. Zu, B. Hu, and A. Elci (Eds.): ICPCA-SWS 2012, LNCS 7719, pp. 350-363, 2013 copyright Springer-Verlag Berlin Heidelberg 2013.

Manolis Tsiknakis, Member IEEE, the European Cancer Informatics Landscape: Challenges for the Biomedical Informatics Community, 2008, Published in: BioInformatics and BioEngineering, 2008. BIBE 2008. 8th IEEE International Conference on Oct. 8-10, 2008. 7 pages.

* cited by examiner

OPTIMIZING A CLOUD-COMPUTING ENVIRONMENT

TECHNICAL FIELD

The present invention relates to optimization of computer resources.

BACKGROUND

A computing platform, such as an enterprise network or a virtualized cloud-computing environment, may comprise an enormous number of configurable components, and the performance of each component may be a function of numerous parameters. It may be possible to improve performance of one component by optimizing parameters associated with that component, but because many components share resources or are otherwise coupled, optimizing one component may reduce performance of another component. Optimization of an entire computing platform, or of a multi-component subsystem of a platform, may thus require simultaneously optimizing parameters of multiple related components. Real-world systems may comprise so many components and configurable parameters, however, that even an optimization method capable of simultaneously optimizing multiple components might not be able to efficiently or accurately complete the task in a reasonable amount of time.

BRIEF SUMMARY

A first embodiment of the present invention provides a method for optimizing a cloud-computing environment, the method comprising:

a processor of a computer system receiving extrinsic data that describes a set of virtual resources of the cloud-computing environment;

the processor selecting a set of candidate resource configurations, wherein every virtual resource of the set of virtual resources is associated with a plurality of candidate resource configurations of the set of candidate resource configurations in a one-to-many relationship;

the processor further selecting a set of candidate environment configurations, wherein each candidate environment configuration of the set of candidate environment configurations comprises at least one candidate resource configuration of the set of candidate resource configurations;

the processor provisioning a virtual test environment, wherein the virtual test environment simulates the cloud-computing environment, and wherein the virtual test environment comprises a virtual representation of each virtual resource of the set of virtual resources of the cloud-computing environment;

the processor configuring the virtual test environment by successively loading the virtual test environment with combinations of a configuration of at least two candidate environment configurations of the set of candidate environment configurations and a configuration of at least two candidate resource configurations of the set of candidate resource configurations, wherein the at least two candidate resource configurations are associated with a same tested resource of the set of virtual resources;

the processor evaluating a first resource-fitness characteristic of a first loaded resource configuration of the at least two candidate resource configurations, wherein the first loaded resource configuration is associated with the same tested resource of the set of virtual resources, and wherein the first resource-fitness characteristic is assigned a value as a function of an operation of the same tested resource within the virtual test environment while the virtual test environment is loaded with the first loaded resource configuration;

the processor deriving a value of an environment-fitness characteristic of a first loaded environment configuration of the at least two candidate environment configurations as a function of an operation of the virtual test environment while the virtual test environment is loaded with the first loaded environment configuration;

the processor ranking the at least two candidate resource configurations as a function of the evaluating and of the deriving;

the processor further ranking the at least two candidate environment configurations as a function of the evaluating and of the deriving;

the processor revising at least one candidate resource configuration of the set of candidate resource configurations and at least one candidate environment configuration of the set of candidate environment configurations as a function of the ranking and of the further ranking;

the processor repeating the configuring, the evaluating, the deriving, the ranking, the further ranking, and the revising until a termination condition is satisfied; and the processor identifying an optimal environment configuration as a function of the further ranking.

A second embodiment of the present invention provides a computer program product, comprising a computer-readable hardware storage device having a computer-readable program code stored therein, said program code configured to be executed by a processor of a computer system to implement a method for optimizing a cloud-computing environment, the method comprising:

a processor of a computer system receiving extrinsic data that describes a set of virtual resources of the cloud-computing environment;

the processor selecting a set of candidate resource configurations, wherein every virtual resource of the set of virtual resources is associated with a plurality of candidate resource configurations of the set of candidate resource configurations in a one-to-many relationship;

the processor further selecting a set of candidate environment configurations, wherein each candidate environment configuration of the set of candidate environment configurations comprises at least one candidate resource configuration of the set of candidate resource configurations;

the processor provisioning a virtual test environment, wherein the virtual test environment simulates the cloud-computing environment, and wherein the virtual test environment comprises a virtual representation of each virtual resource of the set of virtual resources of the cloud-computing environment;

the processor configuring the virtual test environment by successively loading the virtual test environment with combinations of a configuration of at least two candidate environment configurations of the set of candidate environment configurations and a configuration of at least two candidate resource configurations of the set of candidate resource configurations, wherein the at least two candidate resource configurations are associated with a same tested resource of the set of virtual resources;

the processor evaluating a first resource-fitness characteristic of a first loaded resource configuration of the at least two candidate resource configurations, wherein the first loaded resource configuration is associated with the same tested resource of the set of virtual resources, and wherein the first resource-fitness characteristic is assigned a value as a function of an operation of the same tested resource within the virtual test environment while the virtual test environment is loaded with the first loaded resource configuration;

the processor deriving a value of an environment-fitness characteristic of a first loaded environment configuration of the at least two candidate environment configurations as a function of an operation of the virtual test environment while the virtual test environment is loaded with the first loaded environment configuration;

the processor ranking the at least two candidate resource configurations as a function of the evaluating and of the deriving;

the processor further ranking the at least two candidate environment configurations as a function of the evaluating and of the deriving;

the processor revising at least one candidate resource configuration of the set of candidate resource configurations and at least one candidate environment configuration of the set of candidate environment configurations as a function of the ranking and of the further ranking;

the processor repeating the configuring, the evaluating, the deriving, the ranking, the further ranking, and the revising until a termination condition is satisfied; and the processor identifying an optimal environment configuration as a function of the further ranking.

A third embodiment of the present invention provides a computer system comprising a processor, a memory coupled to said processor, and a computer-readable hardware storage device coupled to said processor, said storage device containing program code configured to be run by said processor via the memory to implement a method for optimizing a cloud-computing environment, the method comprising:

a processor of a computer system receiving extrinsic data that describes a set of virtual resources of the cloud-computing environment;

the processor selecting a set of candidate resource configurations, wherein every virtual resource of the set of virtual resources is associated with a plurality of candidate resource configurations of the set of candidate resource configurations in a one-to-many relationship;

the processor further selecting a set of candidate environment configurations, wherein each candidate environment configuration of the set of candidate environment configurations comprises at least one candidate resource configuration of the set of candidate resource configurations;

the processor provisioning a virtual test environment, wherein the virtual test environment simulates the cloud-computing environment, and wherein the virtual test environment comprises a virtual representation of each virtual resource of the set of virtual resources of the cloud-computing environment;

the processor configuring the virtual test environment by successively loading the virtual test environment with combinations of a configuration of at least two candidate environment configurations of the set of candidate environment configurations and a configuration of at least two candidate resource configurations of the set of candidate resource configurations, wherein the at least two candidate resource configurations are associated with a same tested resource of the set of virtual resources;

the processor evaluating a first resource-fitness characteristic of a first loaded resource configuration of the at least two candidate resource configurations, wherein the first loaded resource configuration is associated with the same tested resource of the set of virtual resources, and wherein the first resource-fitness characteristic is assigned a value as a function of an operation of the same tested resource within the virtual test environment while the virtual test environment is loaded with the first loaded resource configuration;

the processor deriving a value of an environment-fitness characteristic of a first loaded environment configuration of the at least two candidate environment configurations as a function of an operation of the virtual test environment while the virtual test environment is loaded with the first loaded environment configuration;

the processor ranking the at least two candidate resource configurations as a function of the evaluating and of the deriving;

the processor further ranking the at least two candidate environment configurations as a function of the evaluating and of the deriving;

the processor revising at least one candidate resource configuration of the set of candidate resource configurations and at least one candidate environment configuration of the set of candidate environment configurations as a function of the ranking and of the further ranking;

the processor repeating the configuring, the evaluating, the deriving, the ranking, the further ranking, and the revising until a termination condition is satisfied; and the processor identifying an optimal environment configuration as a function of the further ranking.

DETAILED DESCRIPTION

Figure 1:
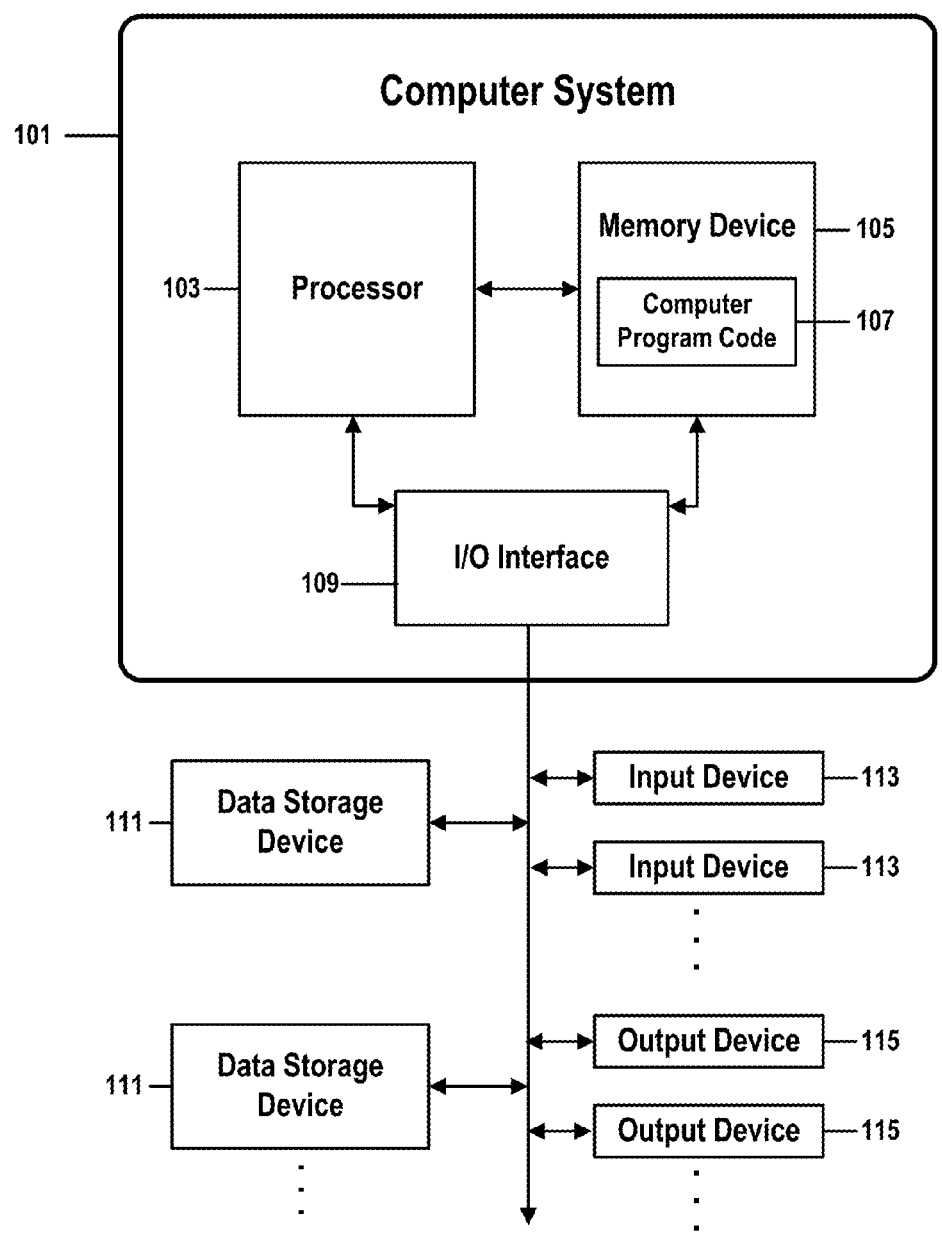
FIG. 1 shows a structure of a computer system and computer program code that may be used to implement a method for optimizing a cloud-computing environment in accordance with embodiments of the present invention.

A computing platform, such as an enterprise network or a virtualized cloud-computing environment, may comprise an enormous number of configurable components, and the performance of each component may be a function of numerous parameters.

Dependencies or other relationships may exist among subsets of these parameters, making it difficult to optimize performance or efficiency of such a platform by independently optimizing performance or efficiency of one or more components. In some cases, attempting to optimize performance of one component may even reduce performance of another component when those components share resources or are otherwise coupled. Optimization of an entire computing platform, or of a multi-component subsystem of a platform, may thus require a method of concurrently or iteratively optimizing parameters of multiple related components.

Embodiments of the present invention solve this problem by creating a model of a biological ecosystem that represents, as elements of a natural ecosystem, the computing platform, its components, and the parameters by which each component may be configured. Within this ecosystem model, sets of configurable parameters of a component of the computing platform, which may identify all or part of a configuration of that component, may be represented as one or more chromosomes of a biological organism.

In such a model, sets of configurable parameters (or chromosomes) may be organized and combined into a first generation of distinct groups, where this organizing and combining is performed as a function of characteristics of the elements' computer-platform analogs, and where each group identifies a complete configuration of one component or a complete genome of an organism. In this biological model, each such group of configurable parameters, if populated with values of the parameters, might be considered analogous to a phenotype of a genome.

Each group of this first generation is then at least partially optimized by means of optimization methods analogous to natural-selection fitness functions. These optimization methods may include operations that mimic an effect of a mutation of a chromosome or of a crossover between chromosomes of a same organism, or may comprise other functions that may have biological analogs known to those skilled in the art of ecology or in the principles of natural selection, such as regrouping, colonization-extinction, or migration. These optimization methods, performed concurrently in a massively parallel manner upon all groups of the first generation, will produce a next generation of groups.

The optimization procedures are then repeated upon this next generation and the process repeats until successive iterations, within resource constraints, no longer produce a significant improvement. The chromosomes of the final generation produced by this method will identify values of the computing platform's configurable parameters that represent an optimized configuration of the entire platform.

FIG. 1 shows a structure of a computer system and computer program code that may be used to implement a method for optimizing a cloud-computing environment in accordance with embodiments of the present invention. FIG. 1 refers to objects 101-115.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to, printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for optimizing a cloud-computing environment in accordance with embodiments of the present invention, and may implement other embodiments described in this specification, including the methods illustrated in FIGS. 1-5. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for optimizing a cloud-computing environment.

Any of the components of the present invention could be created, integrated, hosted, maintained, deployed, managed, serviced, supported, etc. by a service provider who offers to facilitate a method for optimizing a cloud-computing environment. Thus the present invention discloses a process for deploying or integrating computing infrastructure, comprising integrating computer-readable code into the computer system 101, wherein the code in combination with the computer system 101 is capable of performing a method for optimizing a cloud-computing environment.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for cross-retail marketing based on analytics of multichannel clickstream data may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for cross-retail marketing based on analytics of multichannel clickstream data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
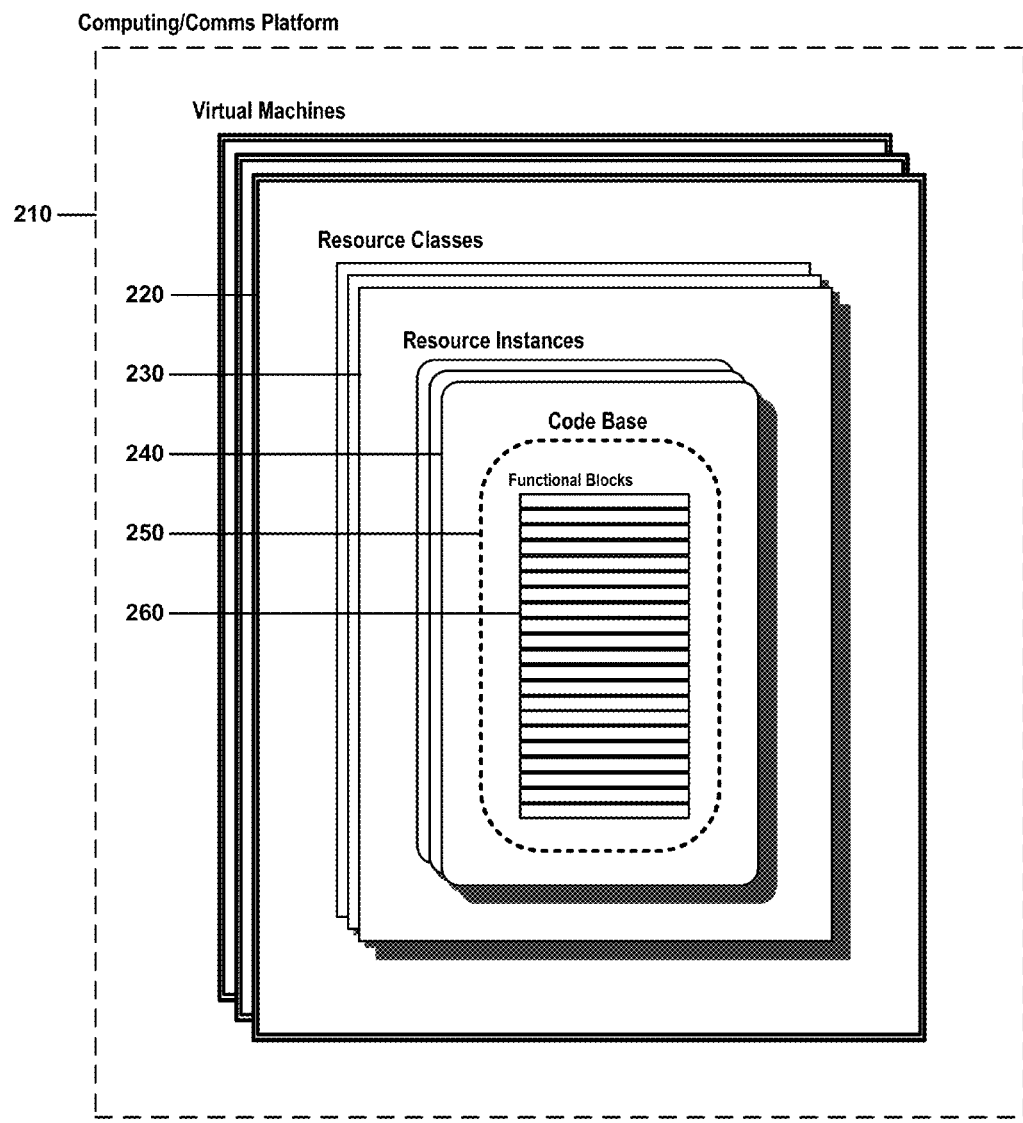
FIG. 2 is a representation of a computing environment to be optimized in accordance with embodiments of the present invention.

FIG. 2 is a representation of a computing environment to be optimized in accordance with embodiments of the present invention. FIG. 2 comprises elements 210-260.

Reference numeral 210 refers to the computing or communications platform in its entirety. Platform 210 may refer to any sort of computational environment, including but not limited to: a virtualized cloud-computing environment, an enterprise network, a cellular network, a wireless local-area network, a server farm, a telecommunications central office, or combinations thereof.

In some embodiments, a computing platform 210 may be part of a larger computing or communications environment. A virtualized cloud-computing environment 210, for example, may be part of a larger distributed mixed physical/virtual cloud platform.

In examples and figures described herein, computing or communications platform 210 will be generally referred to as a platform 210 or an environment 210, and running examples based upon the model of FIG. 2 may illustrate principles, scope, and functionality of the present invention by referring to exemplary cloud-computing platforms 210 and components of a cloud-computing platform 210. These references are so limited solely for illustrative purposes and should not be construed to limit the scope of embodiments of the present invention to cloud-computing platforms or environments.

Reference numeral 220 may refer to one or more virtual machines provisioned within a cloud-computing platform 210. In embodiments in which platform 210 comprises a different type of computing or communications environment, 210 might represent an other entity, such as a network backbone segment, a logical partition of a storage device, one computing site of a distributed computing environment, or one mainframe system of a cluster. The distinguishing characteristic is that item 220 identifies a high-level structure that comprises one or more instances of items 230-260.

In embodiments described herein, platform 210 may comprise more than one entity 220. In our ongoing example, wherein platform 210 is a cloud-computing platform, that platform 210 may comprise multiple virtual machines 220.

Reference numeral 230 identifies one or more resource classes provisioned within virtual machine 220. If a cloud-computing platform 210 comprises multiple virtual machines 220, each such machine 220 may comprise multiple resource classes 230.

Each resource class 230 identifies one class of computing or communications resource instances 220 comprised or hosted by a higher-level entity or structure 220. Depending on implementation details, such a resource may, for example, identify a class of computing system, application, system software, or middleware.

In our cloud-computing example, one resource class 230 may identify Apache Tomcat Web servers running within a first virtual machine 220, a second resource class 230 may identify Oracle WebLogic application servers running on the first virtual machine 220, and a third resource class 230 may identify an Oracle database-management system running on a second virtual machine 220. In another example, a first resource class 230 may merely identify a class of application servers. Instances of such a resource class would then comprise all instances of both the Oracle WebLogic application server and the WebSphere application server.

Reference numeral 240 identifies one or more instances of a resource class 230. In the previous example, if three instances of WebLogic application servers have been installed and are running on the first virtual machine 220, those instances would each be identified as a distinct resource instance 240 of the application-server resource class 230, running on the first virtual machine 220.

Reference numeral 250 identifies a defining configuration of an instance 240 of a resource class 230. In our cloud-computing example, such a defining configuration might comprise an entire code base (that is, the source code) of an instance 240 of a WebLogic application-server resource class 230. There is a one-to-one correspondence between each item identified as a defining configuration 250 and each resource instance 240. In our cloud-computing example, the three WebLogic instances 240 of the application-server resource class 230 would each comprise one instance of a WebLogic application-server code base 250, and each of these code-base instances 250 would completely define functionality of an associated instance 240 of the WebLogic resource class 230.

In some embodiments, two distinct instances 240 of an identical resource might each comprise an identical but distinct code base or other defining configuration 250. In the previous examples, three WebLogic instances 240 of application-server resource class 230 might each comprise an identical instance of the WebLogic application-server code base 250. But the WebSphere application server instance 240 would comprise a different code base, despite the fact that both the WebLogic instances 240 and the WebSphere instance 240 belong to the same application-server resource class 230. This distinction may be a function of the fact that, despite being similar types of applications, the WebLogic application and the WebSphere application comprise different source code.

Reference numeral 260 identifies a functional component of a defining configuration 250 of a resource instance 240. In our cloud-computing example, such a functional component 260 might be a subroutine, module, logical function, or other block of source code comprised by an application instance 240, where the functional component 260 performs a specific function. If resource instance 240 identifies an installed copy of an Oracle database-management system the code base 250 associated with that instance 240 of the Oracle DBMS might comprise two hundred functional components 260. Here, code base 250 might also comprise other functional components that would be omitted from this representation if those omitted components are not relevant to the optimization task performed by the embodiment.

In this example, a component 260 of the two hundred functional components might perform a function like parsing a user query, traversing a database index, updating a field, or performing logical operations comprised by a query string. Each of these functional components would be associated with one or more configurable parameters. Such parameters might include, but are not limited to, combinations of factors such as: a maximum number of query terms, a maximum number of queries that may be parsed concurrently, a maximum allowable number of threads per process, a maximum amount of memory that may be allocated to a process, or a limit on the size of a stored record.

In our application-server example, a code base 250 of an instance 240 of a WebLogic application server might comprise functional modules 260 that each perform a function like maintaining a client connection or managing server processes. Such functional modules or components 260 might be associated with configurable parameters like a KeepAliveTimeout parameter (an amount of time a server is allowed to wait for user requests received through a persistent connection), a MaxSpareServers parameter (a maximum allowable number of idle processes), MinSpareServers (a minimum allowable number of idle processes), or a MaxClients parameter (a maximum allowable number of simultaneous connections).

A goal of embodiments of the present invention is to identify optimal, or most nearly optimized, values of these configurable parameters, each of which is associated with a functional component 260 of a code base 250 of a resource instance 240 of a resource class 230, where configuring each resource instance 240 with the optimal values optimizes overall performance, efficiency, or an other desirable characteristic of computing platform 210.

A goal of some embodiments of the present invention is to identify an optimal, or most nearly optimized, configuration of an entire platform 210. In some cases, an optimal configuration of a platform 210 may not comprise optimal configurations of every resource instance 240, or of every functional block 260 of a resource instance, comprised by the platform 210.

In such cases, the iterative process of the present invention may still perform optimization procedures on every optimizable component of a platform 210 and on the platform 210 itself, and will thus generally increase a degree of optimization of each logical group of configurable parameters. But it is possible that resource constraints, user requirements, dependencies among resource instances, and other factors may prevent some groups of parameters from converging to an optimal state, and it is possible that an optimal, or most nearly optimized, configuration of the platform 210 may not comprise optimal, or most nearly optimized, configurations of one or more components of the platform 210. In such cases, an embodiment of the present invention may, by means of the massively parallel iterative procedure of FIG. 4, optimize both a platform 210 and its components concurrently in order to correctly identify an optimized, or most nearly optimized configuration of platform 210, regardless of whether this configuration comprises optimized, or most nearly optimized configurations of every component of the platform 210.

Figure 3:
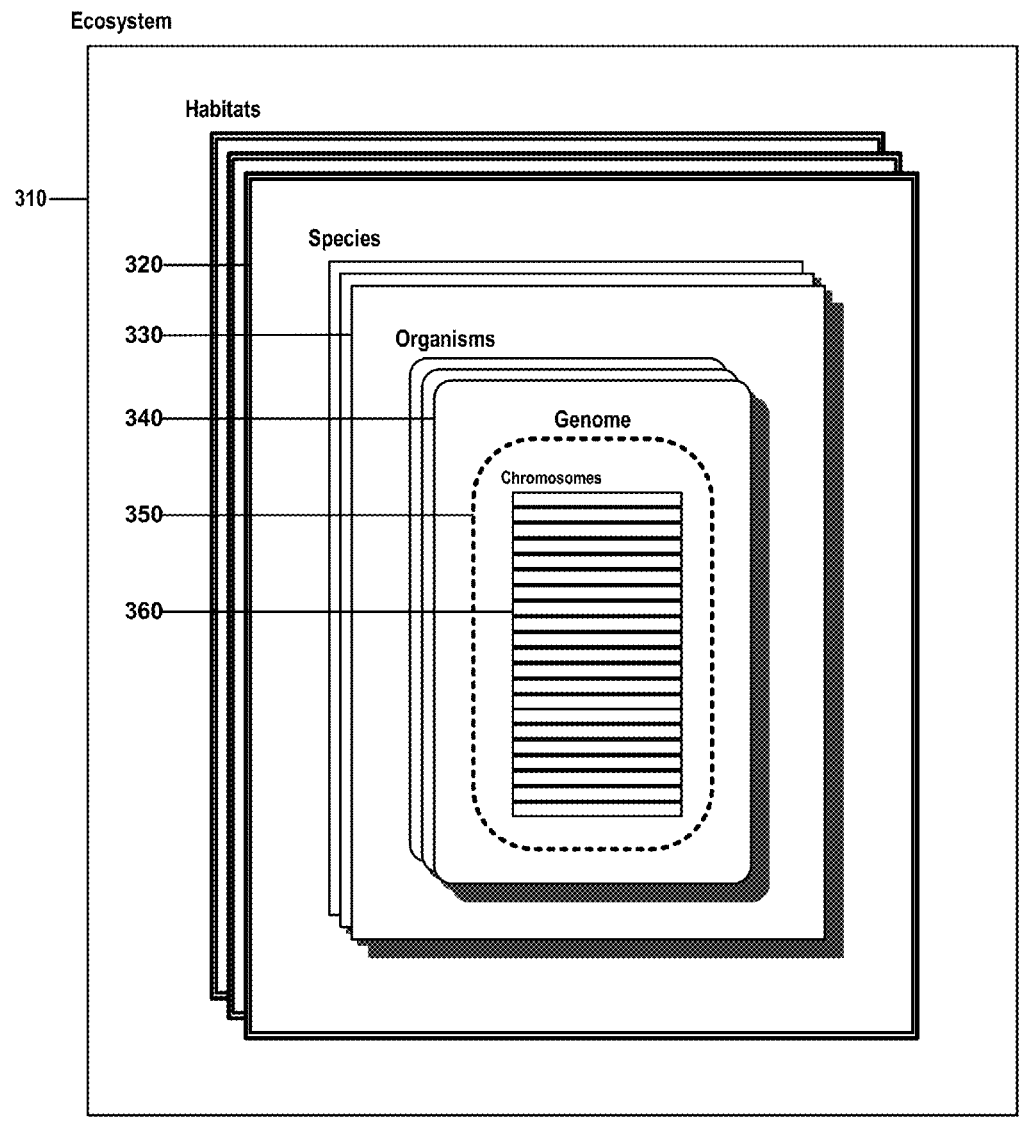
FIG. 3 illustrates a representation of the computing environment of FIG. 2 as a biological ecosystem in accordance with embodiments of the present invention.

FIG. 3 illustrates a representation of the computing environment of FIG. 2 as a biological ecosystem in accordance with embodiments of the present invention. FIG. 3 comprises elements 310-360.

One feature of the present invention is its method of organizing and structuring characteristics of a computing or communications platform in ways that are similar to ways in which certain characteristics associated with a biological ecosystem may be organized and structured. This similarity may be seen clearly by comparing each element of FIG. 3 to its analogous element in FIG. 2.

Reference numeral 310 identifies an ecosystem that, in accordance with embodiments of the present invention, may be analogous to computing or communications platform 210 of FIG. 2. For purposes of this metaphor, platform 310 may refer to any sort of biological ecosystem, including, but not limited to, a rainforest, a stream or lake, a deep-sea region an ocean, an insect colony, digestive tract of an animal, a subset of any of these examples, or combinations hereof.

Exemplary embodiments of the present invention described here map elements of one computing or communications environment onto elements of one ecosystem. But this should not be construed to limit the present invention to a single-ecosystem model. A virtualized cloud-computing environment 310, for example, may be part of a larger distributed mixed physical/virtual cloud platform. Ecosystem 310 may be part of, or may comprise, one or more other ecosystems 310 or other biological environments, and multiple ecosystems 310 may be adjacent or nested in any combination. For the sake of simplicity, the examples of FIGS. 2 and 3 describe a single ecosystem 310 that may be used to model a single cloud-computing platform 210.

Reference numeral 320 refers to one or more habitats comprised by ecosystem 310. Here, in accordance with embodiments of the present invention, such a habitat 320 may be analogous to a high-level structure or virtual machine 220 of FIG. 2.

Each habitat 320 describes a subset of ecosystem 310 that is inhabited by one or more species 330. Many examples exist of such habitats, including, but not limited to: a valley 320 within a temperate forested ecosystem 310; a coral reef 320 of an ocean shoreline 310; or a secluded slope 320 of a mountain range 310.

Reference numeral 330 identifies one or more species of organism that inhabits habitat 320. Here, in accordance with embodiments of the present invention, such a species 330 may be analogous to a resource class 230 of FIG. 2.

If an ecosystem 310 comprises multiple habitats 320, each habitat 320 may comprise multiple species, each of which is identified as a distinct species 330. Each of these species 330 identifies one distinct type of organism 340 that inhabits habitat 320. As is known to those skilled in the art, an enormous number of species of organisms exist in nature. A few isolated examples of species (including some that biologists might classify as a subspecies) include: Siberian tigers, Japanese sea lions, bald eagles, and Western black rhinoceros.

Each instance of reference numeral 340 identifies an organism of a species 330. In accordance with embodiments of the present invention, such an organism 340 may be analogous to a resource instance 240 of FIG. 2.

In one example, if a community of 30 Siberian tigers live on a mountain slope habitat 320 of an ecosystem 310 that encompasses the northern portion of the Eastern Manchurian mountain range, each member of that community would be identified in FIG. 3 as an instance of a distinct organism 340 of the Siberian tiger species 330.

Reference numeral 350 identifies a genome of an organism 340. In accordance with embodiments of the present invention, a genome 350 may be analogous to a code base or other defining configuration 250 of a resource instance, as shown in FIG. 2. There is a one-to-one relationship between each genome 340 and each organism 350; that is, the characteristics of each organism 340 are defined by one genome 350.

In some embodiments, two identical but distinct organisms 340 of a species 330 might each comprise an identical but distinct instance of a genome 350. As will be described below, each genome 350 comprises a plurality of chromosomes 360.

Reference numeral 360 identifies a chromosome comprised by a genome 350 of an organism 340. In accordance with embodiments of the present invention, a chromosome 360 may be analogous to a functional component 260 of a code base 250. A genome 350 may comprise a large number of chromosomes 360, each of which may be associated with one or more characteristics of the organism 340. In some embodiments, all organisms 340 of a same species 330 comprise a genome 350 that contains a same set of chromosomes 360.

Some chromosomes 360 may not be associated with a characteristic of an organism 340 that is related to the organism's fitness, just as some functional blocks 260 may not be associated with functions or parameters of an associated resource instance 240 that are related to the resource instance's performance, efficiency, or other optimizable characteristic.

Figure 4:
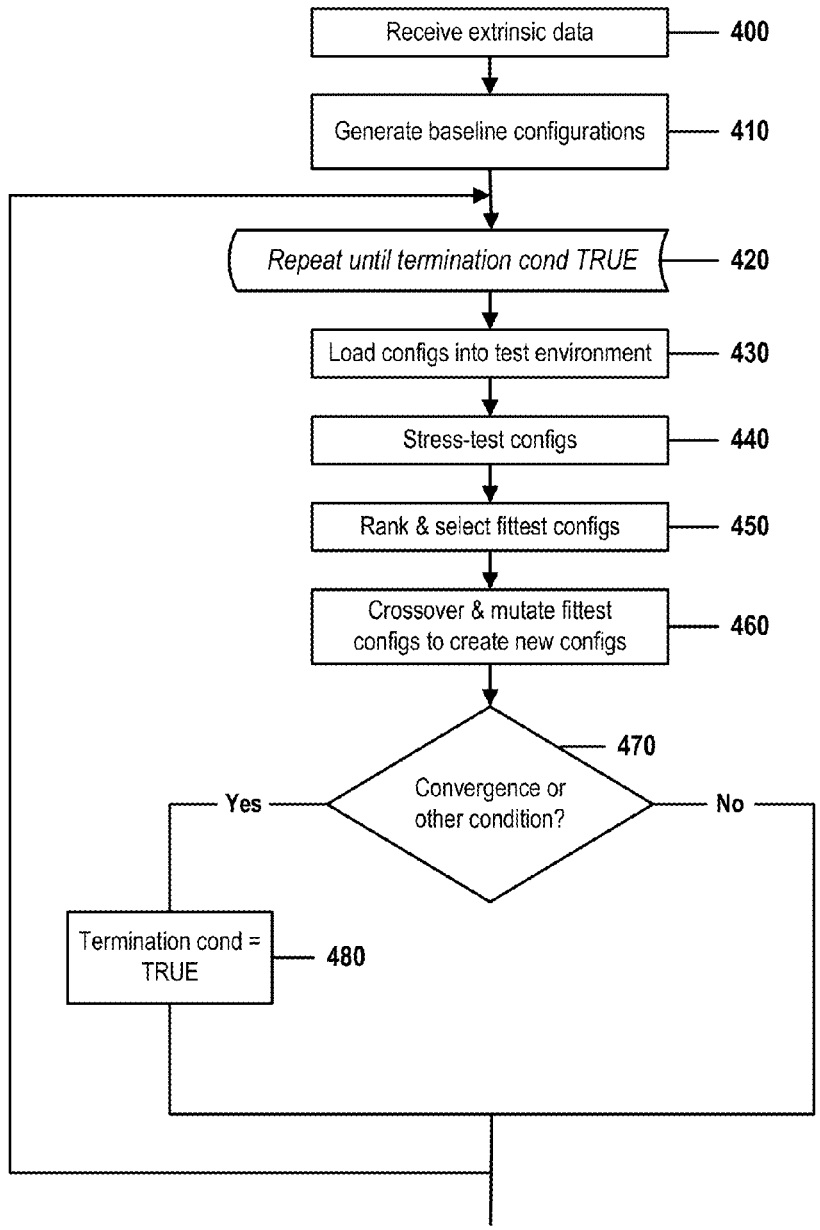
FIG. 4 illustrates a method for optimizing a cloud-computing environment in accordance with embodiments of the present invention.

FIG. 4 illustrates a method for optimizing a cloud-computing environment in accordance with embodiments of the present invention. FIG. 4 comprises steps 400-480.

In step 400, one or more processors of a computer system receive extrinsic data about a cloud-computing environment 210, or an other computing or communications platform 210, that is to be optimized. This extrinsic data allows the one or more processors to organize elements of the environment or platform 210 to be optimized, wherein the organized elements are structured into a framework similar to that shown in FIG. 2.

In addition to descriptions of the organization of the platform or environment 210 and of characteristics of each component of interest comprised by the platform or environment 210, the extrinsic data may also comprise sets of user requirements that identify desired performance, resource-consumption, or efficiency standards, or that identify parameters by which a degree of optimization of platform 210 may be identified.

The extrinsic data may also comprise historical data that identifies performance characteristics and other characteristics of the environment 210 under real-world loads. The extrinsic data may also comprise a description of each element of the environment 210, including descriptions of each virtual machine or other computing system 220, of each resource instance 240, of the resource class 230 of each instance 240, and of the code base 250 and functional blocks 260 comprised by each resource instance 240.

In one example, the extrinsic data may identify a cloud-computing platform 210 that comprises 140 virtual machines 220. It may further identify or characterize one or more resources 240 provisioned on each virtual machine 220, such as specifying that seven WebLogic application servers (server instances 240) are running a first virtual machine 220 of the 140 virtual machines, and that each of the seven installed WebLogic instances 240 belong to an application-server resource class 230.

The extrinsic data may further identify or characterize each element of the environment or platform 210 down to the level of configurable parameters comprised by each functional block 260. In our preceding example, this further identifying or characterizing might comprise identifying a code base 250 (a complete set of source-code instructions) associated with a WebLogic application server and would associate an instance of this WebLogic code base 250 with each installed instance of the WebLogic application server 240.

In this example, the extrinsic data might also identify four hundred functional blocks 260 comprised by each WebLogic code base 250 associated with one of the installed WebLogic instances 240. Each of these functional blocks 260 might then be associated with a set of configurable parameters.

In some embodiments, the extrinsic data may identify characteristics of each configurable parameter. These characteristics might comprise, but are not limited to, a range of acceptable values a parameter may assume, a smallest value by which such a value may be incremented. The extrinsic data may, for example, identify a first configurable parameter MaxKeepAliveRequests comprised by a first communications-services functional block 260 of a WebLogic code base 250 of a first instance 240 of a class 230 of WebLogic application servers. In such a case, the extrinsic data might further identify and associate with MaxKeepAliveRequests a max value of 100, a min value of 50, and a delta (incremental) value of 10. This would allow the processors to identify that MaxKeepAliveRequests may assume any value in the set {50, 60, 70, 80, 90, 100}. In related embodiments, such extrinsic information might be further interpreted as permitting the one or more processors to adjust an existing value of the MaxKeepAliveRequests parameter by incrementing or decrementing a current value by the delta value, so long as the resulting value remained within the max-min range.

The extrinsic data may also comprise historical or archived traffic data, or information culled from a social network or from other extrinsic source, that identifies past demands on elements of the platform 210 and past responses of the platform 210 to such demands. This data may include, but is not limited to, combinations of historical information associated with numbers of user requests, amounts of requested bandwidth, memory usage, fluctuations in available storage capacity, or response time.

The extrinsic data may also comprise information about the values of one or more configurable parameters at a time at which an element of the historical data was recorded. The data might, for example, identify that: during the final week of the first quarter of 2014, the number of incoming requests to connect to a first WebLogic instance 240 installed on a fourth virtual machine 220 fluctuated between 75 requests per hour and 1200 requests per hour; the screen-refresh response time of the WebLogic instance 240 fluctuated during that period, as a function of the number of requests received per hour, within a range of 0.06 seconds and 1.1 seconds; and that the range of the fluctuations varied inversely in proportion to a configurable memory-allocation parameter of a screen-display function 260 of the first WebLogic instance 240.

In one example, the extrinsic data may identify past fluctuations in bandwidth requests made by viewers of a sporting event when a star player is introduced. This data may help system designers identify a more realistic range of projected bandwidth requirements the next time a star player appears.

Other extrinsic information may be received in step 400 that may allow the one or more processors to identify a more detailed or more accurate framework. The extrinsic information might, for example, identify dependencies or relationships among resource instances, functional blocks, or configurable parameters. In the previous example, the extrinsic data might identify a dependency relationship between actual values of the configurable memory-allocation parameter and concurrent actual values of the screen-refresh response time of the WebLogic instance, or might identify a more complex relationship between values of both the memory-allocation parameter and the screen-refresh response time and the rate of connection requests identified by historical traffic data. In some embodiments, the extrinsic data may also include user requirements that identify characteristics of the method of FIG. 4, such as, but not limited to, a maximum number of generations to be generated during the iterative optimization process of steps 420-480 a maximum or minimum number of individuals comprised by each generation, or a method of weighting an importance of a first parameter relative to that of a second parameter.

The extrinsic data received in step 400 may be derived from an entity that owns, manages, or otherwise has expert or historic knowledge of characteristics of the platform 210. Such an entity might include, but is not limited to, one or more of: a system administrator, an information technology or maintenance technician, an automated or manually compiled system log, a statistical analysis, members of a user base, or a historical record.

Once the one or more processors have organized elements of the platform 210 into a framework of the form illustrated in FIG. 2, the one or more processors may then generate an analogous biological framework of the form illustrated in FIG. 3, wherein each element of the platform framework of FIG. 2 is mapped onto a corresponding element of the biological framework of FIG. 3. This mapping correspondence is described in detail in the descriptions above of FIG. 2 and FIG. 3.

In the preceding example, such a mapping might result in correspondences that comprise: associating each installed instance 240 of the WebLogic application server onto an analogous "WebLogic" organism 340; associating the application-server resource class 230 onto an "application-server" species 330; associating the screen-display function 260 one a first WebLogic instance 240 onto a "screen-display" chromosome 360 of a first "WebLogic" organism 340; and associating the memory-allocation parameter of the screen-display function 260 onto a "memory-allocation" gene comprised by the "screen-display" chromosome 360.

It is important to remember that, despite the biological metaphor used throughout this document, the present invention comprises a computer-implemented system and method, and is in the field of computer science, not directly related to any of the biological or natural sciences. The biological metaphor is used here as a conceptual framework that allows correspondences to be drawn between characteristics of parameters of an optimizable non-biological system and characteristics of a self-optimizing biological system. The present invention then performs computerized steps that exploit these correspondences by performing operations that have effect similar to that of certain elements of a natural-selection process.

Such a procedure may be applied in analogous manner to other types of optimizable systems not described in detail in this document, so long as those systems may be decomposed into a framework that may then be modeled as a biological or ecological system, and so long as those systems may be optimized by means of optimizable parameters that may be modeled as genes or chromosomes of the biological or ecological system.

Examples of such an optimizable system comprise, but are not limited to: a product-distribution channel; a warehouse inventory; a mobile congregation of individuals, such as a national sales force, an army division, or a touring stage show; and a management or engineering project. Such systems all have in common two features: i) a set of component entities that may be characterized or configured by values of configurable parameters, where a first set of these values may allow a component, or the system as a whole, to perform its function in a higher-performing, more efficient, or otherwise more desirable manner than would a second set of values; and ii) a hierarchical internal structure of a form that allows the system to be modeled as a biological or ecological ecosystem.

At the conclusion of step 400, the one or more processors will have gathered all information necessary to generate an initial configuration of the models of FIG. 2 and FIG. 3 and will have used this information to organize components of a computing or communications platform (such as a cloud-computing environment 210) into a pair of analogous models, as explained above in the descriptions of FIG. 2 and FIG. 3, where the two generated models respectively represent components of the environment/platform 210 within a non-biological systems context and an ecological context.

At the conclusion of step 400, the one or more processors may also have identified a set of fitness functions that may be used to measure a degree of optimization of a functional block 260/chromosome 360, of a platform 210/ecosystem 310 as a whole, or of a parameter/gene.

A fitness function may take any form by which an entity's "fitness," or degree of optimization may be quantized, and may perform such quantizations as functions of multiple parameters or other factors associated with a performance of a platform or environment 210.

A fitness function of a response-time parameter, for example, may return a value that is inversely proportional to a value of the response-time parameter within a threshold range. If a user requirement received in step 400 identifies that a "perfect" response time is 1.0 second and that decreasing the response time below 1.0 second produces negligible improvement, than a fitness function associated with the response-time parameter might return a value that is an inverse value of response times greater than 1.0 second, and returns a value of 1.0 for any response time less than 1.0 second. In this case, a higher returned fitness value would indicate a more closely optimized response time.

Fitness functions may take any form that is deemed to identify a degree of optimization of an optimizable entity. In some cases, a fitness function may be complex, such as a fitness function that identifies a degree of optimization of an entire cloud-computing platform 210. Such fitness functions may be derived through means known in the art, or as a function of expert knowledge of the structure and operation of the platform 210. In one example, a platform-encompassing fitness function might return a value that indicates an overall fitness or degree of optimization of a platform 210/ecosystem 310 by evaluating a polynomial function in which each term of the polynomial is a function of a fitness value of a configurable parameter/gene comprised by the platform 210/ecosystem 310. In such a case, the polynomial might be simplified by nulling out values related to any parameter that is not relevant to the optimization procedure. In one example, if a configurable parameter that determines a color scheme of a Web server 240's graphical user interface has no relationship to an efficiency or performance of any function of the Web server 240, values of that color-scheme parameter would not be included in any fitness functions derived in this step.

Embodiments of the present invention may comprise two classes of fitness function. A resource (or organism) fitness function identifies a fitness of an instance 240240 of a resource class 230. Fitness may be a function of factors that comprise, but are not limited to, performance or efficiency measurements, such as a response time, an average memory usage, or an average storage usage, and each factor may be weighted to represent relative importance or relevance of each factor.

An environment (or ecosystem) fitness function may identify or quantize similar fitness parameters of an entire platform 210 and may comprise resource fitness functions associated with one or more resource instances 240 comprised by the platform 210. User may determine that response time is 70% weighted importance, storage utilization 20%, etc.

Embodiments of the present invention may evaluate "N-evolutionary" fitness by using both types of fitness functions to concurrently evaluate fitness of a platform 210 and of N resource instances 240 comprised by the platform 210. This N-evolutionary characteristic allows the massively parallel, iterative procedure of the present invention to identify relative degrees of fitness (or degrees of optimization) of a complex platform 210 that comprises resources that are coupled by dependencies and other relationships.

Figure 5:
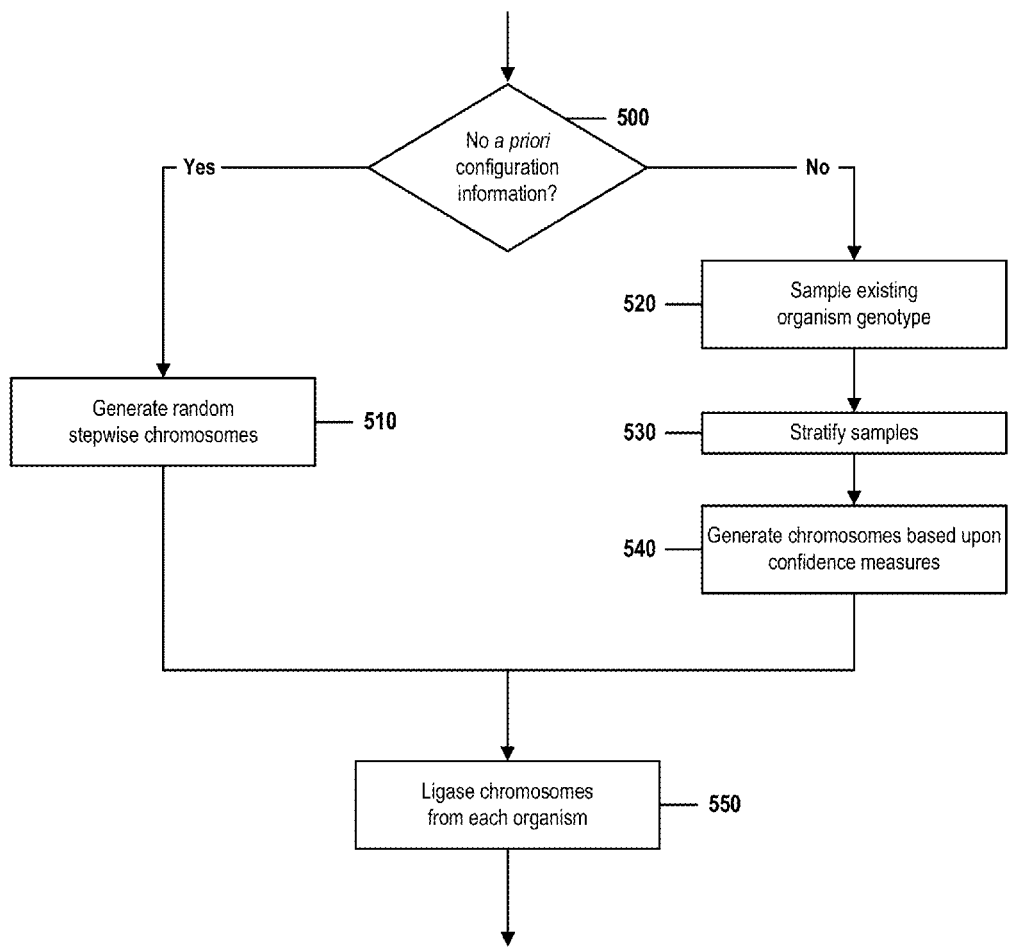
FIG. 5 illustrates details of FIG. 4 that describes a method of generating a set of baseline configurations of components of a cloud-computing environment in accordance with embodiments of the present invention.

In some embodiments, part of this modeling procedure may be delayed until a step of the procedure of FIG. 5 is performed. This may occur, for instance, if it is not possible to identify and characterize some or all relevant optimizable components or parameters during step 400 because the information received in step 400 is incomplete.

In step 410, the one or more processors use the extrinsic information received in step 400 to generate a first generation of baseline configurations of "chromosomes" 360. As described above and below, each such chromosome 360 represents a set of configurable parameters associated with a functional block of an organism 340/resource instance 240.

The method by which this first generation of configurations is assigned initial values is described in greater detail in steps 500-550 of FIG. 5.

These baseline configurations each comprise a data structure that represents one or more chromosomes 360. Each of these representations is structured as a function of characteristics of one or more functional blocks 260 that correspond to the one or more chromosomes. Each of these representations is then populated as a function of elements of the extrinsic data received in step 400.

In one example, consider a first functional block 260 of a WebLogic instance 240 running on a cloud platform 210. Here, the first functional block 260 might represent source code that performs a function of managing users' connections to the WebLogic instance 240. In this example, if the first functional block 260 is associated with twelve configurable parameters (or "genes"), eight of which are relevant to a task of optimizing platform 210 (or of optimizing a component of platform 210), a baseline configuration of the corresponding chromosome 360 might be represented as an 8-element data structure, where each element of the data structure (or, within our biological metaphor, each "gene of the chromosome") identifies a value of one of the eight configurable parameters. As explained in the description of FIG. 5, each of these values may be determined as a function of the extrinsic data received in step 400.

In some embodiments, step 410 and the method of FIG. 5 might group all baseline configurations associated with one resource instance 240/organism 340 into a single corresponding group of chromosomes 360. In such embodiments, at the conclusion of step 410, the one or more processors may have constructed a set of "chromosome group" data structures that may each have been populated with values of corresponding parameters/genes, and that each identifies one possible configuration of one resource instance 240/organism 340.

In some embodiments, the one or more processors may, at the completion of step 410, have generated multiple instances of a chromosome data structure or of a chromosome group data structure, wherein each instance of the multiple instances comprises an identical data structure, but is populated with a different set of values. In such a case, each such instance corresponds to a candidate configuration of a corresponding functional block or blocks 260. Subsequent steps of the method of FIG. 4 would then evaluate these multiple instances and attempt to select the fittest, or most nearly optimized, instance.

Step 420 initiates an iterative process of steps 420-480, where each iteration of this iterative process evaluates the current generation of configurations and determines whether that generation has been optimized to an extent that satisfies user requirements received in step 400. If the current generation is sufficiently optimized, or if an other previously defined termination condition has occurred, then the iterative process ends and the current generation is deemed to be optimal, within user and resource constraints. If the current generation is not found to be sufficiently optimized and if no other previously defined termination condition has occurred, then a next generation of configurations is generated from the current generation and the iterative process begins a next iteration in order to evaluate that next generation.

In some embodiments, the predefined termination condition may cause the iterative process to terminate if a certain number of iterations have been performed, if a certain duration of time has elapsed, or if the method of the present invention has consumed a certain amount of a specified resource. In other embodiments, the iterative process will continue until differences between successive generations decrease to an extent that the generations will be deemed to have converged to an optimal state. In some embodiments, the iterative process will continue until some combination of these methods, or some function of a combination of these methods, results in the identification of a termination condition.

In step 430, the one or more processors insert each configuration of the current generation into a test environment. This test environment may be identified and configured as a function of extrinsic information received in step 400, and this identification and configuration may be performed by means of expert knowledge of characteristics of the platform 210 and of one or more entities comprised by the platform 210, of a goal of the embodiment, of an implementation-related constraint, of a user requirement received in step 400, of historical data received in step 400, or of any other implementation-dependent factor that may help identify a real-world condition to which an entity to be optimized may be subject.

In one example, if the platform or environment 210 to be optimized is a cloud-computing environment, the test environment might comprise a virtualized test environment in which have been provisioned resources analogous to resources provisioned of the real-world platform or environment 210. Similarly, if a real-world cloud platform 210 to be optimized comprises seven instances of a WebLogic application server, the test environment would comprise seven similar instances. And if user requirements require the cloud platform 210 to be optimized to handle a spike in user bandwidth requests when a start athlete comes to bat during a sporting event that will be streamed by means of the WebLogic instances, the test environment would be configured to simulate a similar spike.

In some embodiments this test environment may be an "offline" evaluation environment, in which external demands, resource constraints, and other extrinsic conditions of the test environment are simulated. These simulated values may be derived by any means known to those skilled in the art of software simulation or those who possess expert knowledge of a characteristic of the real-world platform 210 to be simulated by test environment. Such means may comprise selecting simulated values as a function of elements of the extrinsic data received in step 400, or may comprise values selected by statistical means or as a function of values comprised by other platforms that share characteristics with the real-world platform 210 to be simulated.

In some embodiments the test environment may be an "online" evaluation environment, in which external demands, resource constraints, and other extrinsic conditions of the test environment are similar to those of the real-world platform 210 being simulated. Such an online evaluation environment may be implemented by means known to those skilled in the art of test engineering. In one example, wherein a real-world platform 210 comprises a cloud-computing environment, a test environment may be created by forking real-world data associated with the real-world platform 210 to a substantially identical, but distinct, test platform, such that both the real-world platform 210 and the test experience substantially identical operating conditions during the time in which the current generation of configurations is evaluated. In other embodiments, wherein a system to be optimized is not a computer system, a test environment may be configured by analogous, implementation-dependent, methods known to those skilled in the art of the field of the embodiment.

In step 440, each baseline configuration of the current generation of configurations is evaluated or "stress-tested." This evaluation may comprise allowing the test environment to operate under constraints and loads identified in step 430, or as a function of information received in step 400. During such an evaluation, configurable parameters of one or more components of the test environment may assume values selected as a function of values of configurable parameters (or "genes") of one test configuration.

In some embodiments, a distinct set of candidate configurations may exist for every resource instance to be evaluated, and a complete suite of evaluation procedures might comprise successively evaluating some or all configurations associated with combinations or permutations of the each resource instance being evaluated. In some embodiments, these evaluations of components of a platform 210 may be performed in further combination with candidate configurations of the platform in its entirety. Although this feature might result in the one or more processors performing many thousands of evaluations during each iteration of step 440, such a massively parallel evaluation procedure allows embodiments of the present invention to concurrently optimize complex environments that comprise numerous components, and that may be subject to resource constraints, fluctuating demands or loads, and complex dependency relationships among comprised components.

In one example, if a current generation of candidate configurations to be evaluated comprises ten configurations of an instance of an Oracle database application 240, ten sets of evaluations may be performed, one set for each candidate configuration. Here, each candidate configuration is distinguished by its distinct set of values of the configurable parameters associated with the Oracle application, and evaluating such a candidate Oracle configuration would entail configuring the Oracle instance provisioned within the test environment with parametric values identified by the candidate configuration under test.

Each of these ten evaluations might further test a combination of one of the ten Oracle test configurations with a test configuration of another resource instance, or of a test configuration of the platform 210 in its entirety. If, for example, a goal of the evaluation is to identify an optimized configuration of a subsystem that comprises the Oracle application 240 and a WebSphere application 240, and if the current generation of WebSphere configurations comprises 25 candidate configurations, testing all possible combination configurations of the two applications would require 250 evaluations, each of which loads the test environment with parametric values of one of the ten Oracle configurations and with parametric values of one of the 25 WebSphere configurations.

As described above, each of the Oracle candidate configurations comprises a data structure that identifies a distinct set of values of each configurable parameter associated with the Oracle application 240. As explained in the description of step 410, this data structure might comprise a group of all chromosome 360 data structures associated with the Oracle resource instance 240. In this example, step 410 may, for example, have identified configurable parameters (or "genes") comprised by each functional block 260/chromosome 360 associated with the Oracle application 240/organism 340, and then organized each chromosome's parameters into a data structure associated with that chromosome. The one or more processors would have then grouped these Oracle-associated chromosome data structures into a larger Oracle "group" chromosome data structure that comprises all configurable parameters of all functional blocks 260 associated with the Oracle application 240.

By methods of step 410 and FIG. 5, the one or more processors would have spawned a generation of candidate configurations that conform to this group data structure. Each configuration of this generation would then be populated with a distinct set of values of the configurable parameters associated with the Oracle application 240. In the first generation, created in step 410, these values may be selected as a function of elements of the extrinsic data received in step 410 or by means of a method of FIG. 5. Subsequent generations may be populated by values selected by procedures of steps 450 and 460, which perform operations upon the fittest (or most nearly optimized) candidates of a current generation in order to generate a next generation.

In step 450, the one or more processors select and rank the candidate configurations evaluated in step 440. This selecting and ranking is performed by means of one or more fitness functions configured by means known to those skilled in the art as a function of information received in step 400.

In some embodiments, a distinct fitness function may be configured for each resource instance 240/organism 340. Within the scope of the pedagogical biological model of FIG. 3, a fitness function may produce a result similar to that produced by one component of a biological natural-selection process. If, for example, ten candidate configurations of an Oracle application 240 are each successively evaluated in step 440, a fitness function configured to characteristics of the Oracle application would analyze results of each of the ten evaluations and would score or rank each candidate configuration as a function of the results.

Any component of a platform 210/ecology 310 may be associated with one or more fitness functions and, in some embodiments, a single fitness function or set of fitness functions may be associated with a combination of components of the platform 210. In some embodiments, one or more platform fitness functions may be associated with a platform 210 in its entirety, where the one or more platform fitness functions identify, score, or rank the fitness of a platform configuration that may comprise a combination of candidate configurations that are each associated with one or more components of the platform 210.

Within the scope of our systems and biological models of FIG. 2 and FIG. 3, a fitness of an entity is analogous to a degree of optimization. If, for example, a first platform configuration of a cloud-computing platform 210 is identified by a platform fitness function as being more fit than a second platform configuration of the platform 210, the values of the parameters comprised by that first platform configuration may be deemed more fully optimized than the parametric values comprised by the second platform configuration. Using a fitness function to rank candidate configurations is thus analogous to determining which set of parametric values is closest to optimal.

In a simple example, ten candidate configurations of a WebLogic application server 240 may each comprise a distinct set of values of configurable parameters associated with the WebLogic application. Such parameters might include: a disconnect time that identifies how long a user's connection is sustained while there is no user input; an upper limit to an amount of storage space allotted to each user; an upper limit to an amount of network bandwidth allotted to each user; and a number of transactions that a user may perform concurrently. These ten configurations may each be loaded into and evaluated within a test environment similar to a real-world cloud-computing environment 210 to be optimized.

During each candidate configuration's evaluation, the test environment is configured with estimated real-world loads and resource constraints that may help identify how well the cloud-computing environment 210 to be optimized is able to satisfy user requirements when the WebLogic server 240 is configured with values comprised by the candidate configuration under test. In our example, the estimated real-world loads and constraints might limiting the environment 210's overall system I/O bandwidth to 100 Mbps, and overall available storage capacity to 950 terabytes.

In this example, a simple fitness function associated with the WebLogic application server instance 240 might in step 450 identify or rank the fitness or degree of optimization of each candidate configuration as a function of the WebLogic server 240's overall response time under the conditions described above. Other fitness functions may be more complex, and may involve functions of multiple types of measurable results. In some embodiments, a fitness function may be a polynomial in which each term of the polynomial is associated with one parameter or set of parameters, or in which each coefficient of a term represents a relative weighting of that term in the fitness evaluation.

In the ongoing simple example, in which a WebLogic fitness function identifies a fitness or degree of optimization of a candidate configuration of the WebLogic server 240 solely by the WebLogic application's overall average response time, the one or more processors in step 440 evaluate each candidate configuration by configuring the properly loaded and constrained test environment with parametric values identified by the candidate configuration, and then forward to the WebLogic fitness function the resulting value of the WebLogic application's overall average response under these test conditions. At the conclusion of the evaluation of ten WebLogic server 240 candidate configurations, the WebLogic fitness function will have performed a fitness operation on each of the ten resulting average response times. These ten fitness operations will produce final values or scores that allow the ten configurations to be ranked in terms of fitness or degree of optimization.

At the conclusion of step 450, one or more fitness functions will have ranked the candidate configurations evaluated in step 440. Based on user requirements received in step 400, or on a designer's expert knowledge of platform 210, the one or more processors will have selected two or more fittest, or most nearly optimized, candidate configurations of each set of candidate configurations as a foundation for the next generation of candidate configurations.

In one example, a platform 210 comprises 75 resource instances, each of which is associated with a group of functional blocks 260/chromosomes 360 that each identify a set of configurable parameters associated with one of the resource instances. If each generation comprises 100 candidate configurations associated with each of the 75 resource instances, and if the embodiment's fitness functions are configured to identify and rank the ten fittest candidates for each resource instance, then at the conclusion of step 450, the one or more processors will have selected from a current generation of 7500 candidate configurations the 750 most nearly optimized configurations—ten for each of the 75 resource instances—and will in the next step generate a next generation of candidate configurations from these 750 selected configurations.

In step 460, the one or more processors generate a next generation of candidate configurations from the sets of fittest, or most nearly optimized, configurations identified in step 450.

This generating the next generation may comprise performing operations upon the fittest configurations selected in step 450, where those operations may be considered to be analogous to a crossover function of a natural-selection process. This crossover function may be implemented by any means known to those skilled in the art of data analysis or computer science, and parameters that guide the operation of the crossover function may be determined by means known to those skilled in the art as a function of implementation-dependent details or of expert knowledge of user requirements.

In biological terms, a crossover event generates a child chromosome by partially combining genetic material of two parent chromosomes. In the systems model of FIG. 2, this operation may be implemented by analogous operations performed upon two or more functional blocks 260/chromosomes 360.

If, for example, a first parent instance of a WebLogic chromosome data structure comprises four elements of data ("genes") that each identify a value of a configurable parameter of a WebLogic resource class 230:

| 2200 | 14 | 00 | 701102 |
|------|----|----|--------| and a second parent instance comprises:

| 3010 | 7 | 00 | 316640 |
|------|---|----|--------| then performing a crossover operation on the two parents might produce two child WebLogic chromosomes formed by swapping the chromosomes' fourth gene:

| 3010 | 7  | 00 | 701102 |
|------|----|----|--------|
| 2200 | 14 | 00 | 316640 |

Crossover functions may vary as a function of implementation-dependent details. Crossover functions may, for example, vary in the way that they select which gene or genes of a selected chromosome to swap; a proportion of the total number of chromosomes in a genome or in a chromosome group to cross over; or a number of child chromosomes to generate by means of a crossover function for each generation of candidate configurations.

More sophisticated crossover functions may implement this operation in more complex or nuanced ways. A variant of a standard tournament-selection procedure, for example, might comprise a selection strategy of randomly selecting a predetermined portion of the population of fittest configurations identified in step 450, crossing the two fittest configurations of the random sample to produce a child configuration, adding the child to the population of fittest configurations, choosing a new random selection from the updated population, and repeating until the population has grown to a desired size.

In some embodiments, a goal of step 460 will be to add enough new child configurations to the selections chosen in step 450 to ensure that the next generation of candidate configurations will comprise the same number of individuals as did each of the previous generations.

In some embodiments, the one or more processors may in step 460 mutate the populations of fittest configurations selected in step 450 and subsequently increased in step 460 through crossover operations.

In nature, a mutation of a chromosome comprises a random variation of one or more genes of the chromosome. In our model, a mutation function may perform an analogous operation by randomly varying one or more values of a functional block 260.

As with crossover operations, characteristics of a mutation function may vary as a function of implementation-dependent details. A mutation function may, for example, be fine-tuned by adjusting a chance of mutation. In such a case, an embodiment that specifies a 1% chance of mutation may apply a mutation operation to one gene out of every hundred genes, to one chromosome out of every hundred chromosomes, or to one candidate configuration out of every hundred candidate configurations associated with a particular resource instance 240/organism 340.

Mutating a functional block 260/chromosome 360 of a resource instance 240/organism 340 generally comprises randomly varying one or more parametric values associated with the resource instance 240 and with the functional block 260. In embodiments in which the extrinsic information received in step 400 comprises a range and minimum increment of values of the parameter undergoing mutation, the value of the parameter after mutation may be selected by any means known to those skilled in the art, so long as the value conforms to the specified range and minimum increment. A value of a mutation may, for example, be selected randomly from values that fall within the specified range, may be selected as a function of a statistical distribution, may be selected as a function of historical values, or as a function of multiple criteria.

In some embodiments, the one or more processors may, in step 460, perform crossover and mutation operations in any order, or may omit one or both of these operations as required by implementation-dependent details or user requirements. In some embodiments, a mutated configuration may replace its parent configuration in the next generation of configurations. In other embodiments, the next generation will comprise both the mutated configuration and the parent configuration from which it was generated.

At the conclusion of step 460, the one or more processors will have generated a next generation of candidate configurations, where that next generation comprises the fittest (most nearly optimized) candidate configurations of the most recent generation, where the next generation may further comprise new configurations generated by crossing other configurations of the most recent generation, and where one or more of the configurations of the next generation have been created by a mutation of an other configuration.

In step 470, the one or more processors determine whether a termination condition has been satisfied. If so, a termination flag is set to TRUE in step 480, the method of FIG. 4 terminates and the fittest platform configuration, as selected in steps 450 or 460, is identified as a most nearly optimized configuration. In some embodiments, this determination may occur prior to any mutation or crossover operations of step 460.

If, the one or more processors determine that a termination condition has not been satisfied, then the current iteration of the iterative process of steps 420-480 ends and the next iteration begins. This next iteration will process the next generation of candidate configurations, as generated in the most recent iteration of steps 450 and 460.

Selection of a termination condition may be implementation dependent and may be a function resource constraints, other technical constraints, financial constraints, timing or scheduling constraints, or other factors identified by system designers.

Some embodiments may, for example, specify a termination conditions that is satisfied when the one or more processors identify a configuration that, even if not optimal, satisfies a set of minimum criteria. Other embodiments may limit the iterative process of steps 420-480 to a certain maximum number of iterations, to a certain duration of time, to a certain amount of usage of virtualized resources, or to combinations thereof. If, for example, an embodiment limits the iterative process to 1000 iterations, the iterative process will end after 1000 loops, regardless of whether an optimal configuration has been identified, and may return at that time the fittest configuration that it has been able to identify in any prior iteration, or the fittest configuration that it has identified in the most recent iteration.

In embodiments that are not constrained in these ways, the iterative process of steps 400-470 may terminate only when two or more successive generations of candidate configurations are seen to have converged to an optimal state. This may be determined by means of implementation-dependent criteria and may, for example, occur when some or all chromosomes of two or more successive generations are identical within a tolerance range (discounting the effect of mutation); or when a single generation comprises candidate configurations of a single resource instance 240/organism 340 that are identical within a tolerance range (discounting the effect of mutation).

Embodiments that optimize a platform 210 may identify an optimal convergence only when candidate configurations of the platform 210 as a whole converge. If, for example, configurations of a Web server instance 340 comprised by the platform 210 converges but the platform 210 itself does not, then convergence has not occurred. On the other hand, a convergence termination condition may be deemed to have occurred when candidate configurations of the platform configuration 210 converge, even if candidate configurations of the Web server 340 do not converge.

In some embodiments, convergence of the platform 210 or of some or all of the components of the platform 210 may constitute a default termination condition. Other termination conditions, such as satisfaction of some other secondary criteria or the completion of a maximum number of iterations, may be considered only when it is determined that, although some entities converge or are converging, other entities do not seem to be converging to an optimal configuration with each successive generation.

FIG. 5 illustrates details of step 410 of FIG. 4, which describes a method of generating a set of baseline configurations of components of a cloud-computing environment in accordance with embodiments of the present invention. FIG. 5 comprises steps 500-550.

In step 400 of FIG. 4, one or more processors received extrinsic information about a computing or communications platform 210 that may allow elements of the environment or platform 210 to be organized into frameworks similar to those shown in FIG. 2 or FIG. 3, and that may further identify user requirements, resource constraints, and other information that allows the one or more processors to perform further steps of FIG. 4.

In step 410 of FIG. 4, the one or more processors use the extrinsic data received in step 400 to generate a first generation of baseline configurations of components of the environment or platform 210. Each baseline configuration identifies a possible configuration of one resource instance 240 of a resource class 230 and comprises a distinct set of values of a set of configurable parameters associated with that resource class 230.

In one example, a platform 210 might comprise three classes 230 of resources, one of which might be a resource class 230 of Apache TomCat Web servers. Components of the platform 210 might comprise four resource instances 240 of this TomCat resource class 230, each of those four instances 240 would in turn comprise an instance of a TomCat code base 250 associated with the TomCat resource class 230, and each instance of the TomCat code base 250 would in turn comprise all functional blocks 260 associated with an instance of a Tomcat Web server. Each of these functional blocks 260 would be associated with set of configurable parameters that may be loaded with a set of values that identify a configuration of that functional block in a particular TomCat instance 240.

In this example, the one or more processors in step 410 might generate a set of baseline candidate resource configurations for each of the four resource instances 240, where each generated baseline configuration identifies a set of values of configurable parameters comprised by one or more functional blocks 260 of one instance 240 of the TomCat resource class 230 comprised by platform 210. If, for example, it is deemed that step 410 should create a generation of baseline candidate resource configurations that comprise 100 possible configurations for each resource instance 240, the one or more processors in step 240 would in step 410 (by means of a procedure of FIG. 5) create an initial generation of 400 baseline resource configurations that are compliant with a code base 250 of a TomCat Web server (100 for each of the four TomCat instances 240). Each of these configurations would comprise a possible set of values of configurable parameters associated with TomCat Web servers. Further steps of the present invention would spawn future generations of configurations from this initial generation, analyzing configurations of each spawned generation in order to identify and select one or more most nearly optimized configurations.

In some embodiments, a baseline resource configuration may specify values of all configurable parameters comprised by all functional blocks 260 of a resource instance 240. In others, a baseline resource configuration may specify values of a subset of all configurable parameters comprised by all such functional blocks 260. In either case, a baseline resource configuration may omit values of configurable parameters that are not deemed to be sufficiently relevant to an optimization procedure of the present invention, wherein this deeming may be a function of extrinsic data, such as resource constraints or user requirements, received in step 400, or may be a function of expert knowledge of a designer of the embodiment.

Translating this step into analogous terminology of the biological model of FIG. 3, each baseline resource configuration generated in step 410, by means of a procedure of FIG. 5, comprises a phenotype of a genome 350 (code base 250) of each organism 340 (resource instance 240), wherein the genome 350 is specific to a species 330 (resource class 230), and wherein the phenotype comprises a listing of all genes (a set of values of all configurable parameters) comprised by chromosomes 360 (functional blocks 260) of the genome 350 associated with this particular species 330.

In step 500, the one or more processors determine whether a priori extrinsic data received in step 400 comprises information sufficient to enable the processors to generate configurations as a function of real-world characteristics of platform 210. If the processors determine that the extrinsic data is sufficient to support such a procedure, the method of FIG. 5 continues with steps 520-540. If the data is determined to be insufficient, the method of FIG. 5 instead continues with step 510.

In step 510, the one or more processors, lacking sufficient extrinsic information to create configurations as a function of real-world performance, load, resource constraint, user-requirement, or other received data, generates the configurations through a statistical, random, or other procedure.

In performing one of these other procedures, the one or more processors might, for example, randomly select a value of one or more configurable parameters, or might randomly select a value that falls within a range that is identified by the extrinsic information received in step 400 or that is identified by means of expert knowledge possessed by a designer, implementer, or user of an embodiment of the present invention.

In other examples, a value of a parameter might be selected by means of a statistical operation that may be a function of a known statistical distribution or procedure. Such an operation may, for example, be a function of a mean of a known range of values, may be a function of a known distribution pattern, such as a Bell Curve or Gaussian distribution function or a Poisson distribution, or may be a variation, component, or corollary of an other mathematical theorem or procedure known to those skilled in the art, such as an element of Holland's schema theorem.

In other examples, a first value of a parameter might selected by any combination of these or similar methods and assigned to one candidate configuration of a resource instance 240 and subsequent values, to be assigned to other candidate configurations of the same resource instance 240, would then be selected as a function of the first value, or as a function of a different combination of methods.

At the conclusion of step 510, the one or more processors will have created a set of configurations associated with each functional block 260 comprised by platform 210. As described above, platform 210 will comprise a distinct set of functional blocks 260 for each resource instance comprised by platform 210.

In one example, step 510 might generate ten candidate baseline configurations of each functional block 260 comprised by platform 210. If platform 210 comprises two resource classes 230, each of which is associated with 25 functional blocks, and platform 210 comprises six instances of a first resource class of the two resource classes and three instances of a second resource class of the two resource classes, then step 510 will generate:

(10 sets of configurations)*(25 blocks associated with each resource instance)*(6 instances of the first resource class+2 instances of the second resource class)=10*8*25 functional blocks =2000 distinct configurations, each of which identifies a set of values of configurable parameters associated with one resource class 230. In step 550, as described below, these 2000 configurations might then be organized into eighty groups, where each group of the eighty groups identifies one of ten sets of all relevant values associated with one of the resource instances 240 of platform 210.

At the conclusion of step 510, the method of FIG. 5 continues with step 550, described below.

If the one or more processors in step 500 determine that a priori extrinsic data received in step 400 comprises information sufficient to enable the processors to generate baseline resource configurations as a function of real-world characteristics of platform 210, the method of FIG. 5 proceeds from step 500 to step 520, skipping step 510.

In step 520, the one or more processors begin a process of creating a generation of baseline configurations as a function of extrinsic data received in step 400. This process begins by sampling current or past real-world values of one or more configurable parameters of functional blocks 260 of the platform 210. Here, those real-world values may be identified as a function of the extrinsic data received in step 400. In one example, the extrinsic data may comprise performance or system logs from which such values, or an aggregation, average, or other function of such values, may be retrieved.

In other embodiments, a more complex or nuanced selection method, including methods based on functions or techniques known to those skilled in the art, may be performed. In one example that comprises a variation of the Holland schema theorem, the one or more processors may create a set of ten distinct configurations, or instances, of a functional block 260, where each instance of the ten distinct configurations comprises a random set of values of configurable parameters identified by the block 260. The one or more processors would then rank the ten randomly generated configurations by means of a fitness function or other ranking mechanism.

In other embodiments, the one or more processors may in step 520 sample values of configurable parameters of a resource instance 240 from a set of real-world current or historical values culled from the extrinsic information received in step 400. The one or more processors might then build each configuration as a function of the sampled values. Such a function might comprise duplicating an existing real-world set of values, duplicating a subset of such an existing set of values, generating new values by performing a statistical or other mathematical function on the existing set of values, combining values generated by any of these means with randomly selected values, or a combination of these and other value-selection methods. In yet another embodiment, the one or more processors in step 520 might select values as a statistical function of a distribution of values comprised by the extrinsic data received in step 400.

In step 530, the one or more processors stratify or rank the baseline configurations selected in step 520. This stratification might organize or sort the configurations into percentile slots as a function of an operation of a fitness function, of similarities among configurations, of a statistical operation known to those skilled in the art of data analysis, or of a combination of any of these or other appropriate data-analysis techniques.

In one embodiment, a designated number of configurations might be selected randomly, or as designated by an implementation-dependent function, from each of a set of percentile ranges. In one example, if 1000 configurations are ranked into ten percentile ranges, each of which spans a 10% range of relative fitness of a ranked configuration, the one or more processors may in step 530 select 10% of the configurations in each range, or may select ten configurations from each range. Many other selection methods are possible, some of which are known to those skilled in the art and some of which are a function of implementation-dependent criteria.

In some embodiments, specific configurations, configurable parameters, resource classes, resource instances, functional blocks, or other entities may be weighted to represent their relative importance or relevance. This weighting may be configured, selected, or implemented as a function of either statistical functions known to those skilled in the art, expert knowledge of the platform 210, or extrinsic information received in step 400.

In step 540, the one or more processors selects a final set of baseline configurations from the configurations chosen in step 530. This final selection may be a function of a confidence interval identified by expert knowledge of a system designer or by user requirements comprised by the extrinsic information received in step 400.

In one example, if a 95% confidence interval is desired, the one or more processors may achieve this goal by means of a statistical method known to those skilled in the art and based on a mean and standard deviation of real-world values comprised by the extrinsic information or based on a mean and standard deviation of the configurations generated in step 530, based on. Such a statistical method would determine a number of configurations that must be selected in order to ensure, with 95% confidence, that the number of configurations is likely to provide an accurate representation of real-world values of corresponding configurable parameters of the platform 210.

At the conclusion of step 540, a set of baseline configurations will have been selected for each resource instance 240/organism 340, where each baseline configuration of a resource instance 240 will comprise a set of values of configurable parameters associated with that resource instance 240. In embodiments in which all the functional blocks comprised by the resource instance 240 have been combined prior to this step (rather than below, in step 550), each baseline configuration of the resource instance 240 will comprise values of all relevant configurable parameters associated with the resource instance 240.

In the parlance of the biological model of FIG. 3, at the conclusion of step 540, the one or more processors will have generated a set of baseline phenotypes configuration of each chromosome 360 of each organism 340 of the ecosystem 310. In embodiments in which all the chromosomes of the organism 340 have been combined prior to this step (rather than below, in step 550), into an instance of a genome 350 of the organism 340, each baseline phenotype of the organism 340 will comprise a phenotype of the entire genome 350 of the organism 340.

In step 550, instances of functional blocks 260 generated by a method of FIG. 5 may be organized into groups that each comprise one populated set of all functional blocks 260 comprised by one resource instance 240. In a process analogous to a ligasing (or joining) of a set of chromosomes into a single larger molecule, the one or more processors here combine, append, merge, join, or otherwise associate functional blocks 260 to form a set of complete resource configurations that each represent a candidate resource configuration of one resource instance 240.

In embodiments wherein steps 510-540 have generated multiple instances of each functional block 260, each resource configuration may be formed from a group of functional blocks 260 that share an association. Such an association may, for example, be identified when the functional blocks 260 are generated in steps 510-540, as a function of a method of generation.

In other embodiments, functional blocks 260 generated in steps 510-540 may be mixed and matched in step 550 to generate configurations that may share some same functional blocks in different combinations.

In one example, if a resource class 230 is associated with sixty functional blocks 260, steps 510-540 may generate ten instances of each block 260 as components of ten baseline configurations of a resource instance 240 of the resource class 230. Here, each instance is associated with one set of ten distinct sets of the sixty blocks 260, and each set is associated with one configuration of the resource instance 240.

This first method would produce ten complete baseline resource configurations if the processors in step 550 simply ligase each distinct set of blocks 260 into one configuration. However, if the processors in step 550 are free to generate a baseline resource configuration that combines blocks 260 associated with more than one set of the ten distinct sets, then many thousands of configurations are possible as combinations of the six hundred generated blocks 260.

In embodiments that comprise this second method, a method of selecting each combination of blocks may be configured by any means known to those skilled in the art of statistical modeling, information technology, or other fields. Blocks may be selected by a method that comprises one or more random selections, one or more selections based on statistical distributions of values of each configurable parameter, or one or more selections that consider factors such as a value's distance from a mean, a number of instances of configurable parameters that comprise identical values, and so forth.

At the conclusion of step 550, the one or more processors will have assembled a set of baseline resource configurations for each resource instance 240 of the platform 210. Each set may comprise a number of configurations that is determined as a function of extrinsic information received in step 400, that may be a function of the size or number of one or more elements represented in the model of FIG. 2, or of other implementation-dependent factors.

Each configuration of such a set of baseline resource configurations identifies a set of values of all configurable parameters associated with one resource instance 240 of the platform 210. In some embodiments, every configuration associated with a particular resource instance 240 must identify a distinct and unique combination of values. In some embodiments, no two configurations associated with a particular resource instance 240 may comprise identical values of a same configurable parameter. In other embodiments, values identified by each configuration may be subject to other constraints, or may be permitted to assume any values within a range of values identified by the extrinsic information received in step 400.

The one or more processors will then, at the conclusion of the method of FIG. 5, perform step 420 of FIG. 4, which will initiate a first iteration of the iterative process of steps 420-480, and wherein this first iteration will evaluate one set of baseline resource configurations generated by the method of FIG. 5 for each resource instance 240 of platform 210.

In some embodiments, the procedure of FIG. 5 may further produce, in a similar manner, a set of baseline environment configurations, each of which comprises a set of values of configurable parameters associated with the entire platform 210. These baseline environment configurations may be generated from the ground up, by generating distinct instances of functional blocks 260 associated with relevant performance, efficiency, or other characteristics of the platform as a whole. In other cases, each baseline environment configuration may be assembled in step 550 by joining (or "ligasing") instances of functional blocks generated by a method of FIG. 5, by joining (or "ligasing") baseline resource configurations generated by a method of FIG. 5, or by a combination of the two techniques.

In some embodiments, the procedure of step 550 may be performed at a different sequential point of a method of FIG. 4 or FIG. 5. In one example, instead of performing a step 510 or steps 520-540 on discrete or isolated functional blocks 26, step 510 or steps 520-540 may instead be performed on sets of functional blocks 260 that have already been joined by a procedure similar to that of step 550 described above.

In some embodiments, a joining or ligasing function may comprise a creation of a polynomial function in which each term or coefficient of the polynomial represents a value of one configurable parameter or other information stored in one functional block 260 or in some other logical entity comprised by a resource instance 240. Such polynomial representations may be associated with one or more polynomial based fitness functions described above.

What is claimed is:

1. A method for optimizing a cloud-computing environment, the method comprising:
   a processor of a computer system receiving extrinsic data that describes a set of virtual resources of the cloud-computing environment;
   the processor selecting a set of candidate resource configurations, wherein every virtual resource of the set of virtual resources is associated with a plurality of candidate resource configurations of the set of candidate resource configurations in a one-to-many relationship;
   the processor further selecting a set of candidate environment configurations, wherein each candidate environment configuration of the set of candidate environment configurations comprises at least one candidate resource configuration of the set of candidate resource configurations;
   the processor provisioning a virtual test environment, wherein the virtual test environment simulates the cloud-computing environment, and wherein the virtual test environment comprises a virtual representation of each virtual resource of the set of virtual resources of the cloud-computing environment;
   the processor configuring the virtual test environment by successively loading the virtual test environment with combinations of a configuration of at least two candidate environment configurations of the set of candidate environment configurations and a configuration of at least two candidate resource configurations of the set of candidate resource configurations, wherein the at least two candidate resource configurations are associated with a same tested resource of the set of virtual resources;
   the processor evaluating a first resource-fitness characteristic of a first loaded resource configuration of the at least two candidate resource configurations, wherein the first loaded resource configuration is associated with the same tested resource of the set of virtual resources, and wherein the first resource-fitness characteristic is assigned a value as a function of an operation of the same tested resource within the virtual test environment while the virtual test environment is loaded with the first loaded resource configuration;
   the processor deriving a value of an environment-fitness characteristic of a first loaded environment configuration of the at least two candidate environment configurations as a function of an operation of the virtual test environment while the virtual test environment is loaded with the first loaded environment configuration;
   the processor ranking the at least two candidate resource configurations as a function of the evaluating and of the deriving;
   the processor further ranking the at least two candidate environment configurations as a function of the evaluating and of the deriving;
   the processor revising at least one candidate resource configuration of the set of candidate resource configurations and at least one candidate environment configuration of the set of candidate environment configurations as a function of the ranking and of the further ranking;
   the processor repeating the configuring, the evaluating, the deriving, the ranking, the further ranking, and the revising until a termination condition is satisfied; and
   the processor identifying an optimal environment configuration as a function of the further ranking.

2. The method of claim 1, wherein a first virtual resource of the set of virtual resources comprises a first set of functional blocks, wherein a first functional block of the first set of functional blocks comprises a first set of configurable parameters, and wherein a first configuration of the first virtual resource comprises a first set of values of the first set of configurable parameters.

3. The method of claim 2, further comprising:
   the processor organizing the set of virtual resources, the functional blocks comprised by each virtual resource of the set of virtual resources, and the sets of configurable parameters associated with each virtual resource of the set of virtual resources into a hierarchical structure, wherein the organizing is performed as a function of the extrinsic data.

4. The method of claim 1, wherein the virtual test environment is provisioned as a function of resource constraints, projected loads, and user requirements further described by the extrinsic data.

5. The method of claim 1, further comprising:
   the processor identifying a plurality of distinct subsets of a union of the at least two candidate environment configurations and the at least two candidate resource configurations; and
   the processor performing multiple iterations of the loading, evaluating, and deriving, wherein each iteration of the multiple iterations comprises loading the virtual test environment with a different subset of the plurality of distinct subsets.

6. The method of claim 2, further comprising:
   the processor organizing the set of all functional blocks comprised by all virtual resources of the set of virtual resources into a set of groups,
   wherein a first group of the set of groups comprises all functional blocks that comprise one or more configurable parameters associated with a first resource of the set of virtual resources,
   wherein a configuration of the set of first-resource configurations, of the set of candidate resource configurations, that identifies a configuration of the first resource and comprises the first group of the set of groups, and
   wherein a distinct candidate configuration of the first resource is identified by a distinct set of one or more values of the one or more configurable parameters comprised by a resource configuration of the set of first-resource configurations.

7. The method of claim 2, wherein revising a first candidate resource configuration comprises revising one or more values of one or more configurable parameters comprised by the first candidate configuration, wherein the first candidate resource configuration is selected from the set of candidate resource configurations by an application of a first statistical function, wherein the one or more configurable parameters are selected from a set of all configurable parameters comprised by the first candidate resource configuration by an application of a second statistical function, and wherein the revised one or more values are selected by an application of a third statistical function.

8. The method of claim 7, wherein the first, second, or third statistical function comprises a random selection.

9. The method of claim 2, wherein the revising at least one candidate resource configuration comprises producing and adding two new configurations to the set of candidate resource configurations by crossing two existing configurations of the set of candidate resource configurations, wherein the two existing configurations each identify a distinct configuration of a same crossover resource of the set of virtual resources, and wherein crossing a first configuration of the two existing configurations with a second configuration of the two existing configurations comprises:
the processor selecting one or more configurable parameters common to both of the two existing configurations; and
the processor swapping a first set of values of the selected one or more configurable parameters comprised by the first configuration with a second set of values of the selected one or more configurable parameters comprised by the second configuration,
wherein the two existing configurations are selected from the set of candidate resource configurations by an application of a first statistical function, and wherein the selected one or more configurable parameters are selected from a set of all configurable parameters comprised by the two existing configurations by an application of a second statistical function.

10. The method of claim 9, wherein the first statistical function or the second statistical function comprises a random selection.

11. The method of claim 1, wherein the termination condition is satisfied when one repetition of the configuring, the evaluating, the deriving, the ranking, the further ranking, and the revising does not substantially alter the set of candidate resource configurations and the set of candidate environment configurations, wherein the substantially altering comprises producing a difference in one or more values of one or more configurable parameters comprised by the set of candidate resource configurations or by the set of set of candidate environment configurations, such that the produced difference exceeds a predetermined threshold level.

12. The method of claim 1, wherein the termination condition is selected from a group comprising: repeating the provisioning, the configuring, the evaluating, the deriving, the ranking, the further ranking, and the revising a predetermined number of times; consuming an amount or number of resources that exceeds a predetermined threshold level; and exceeding a time limit.

13. The method of claim 1, wherein the identifying an optimal environment configuration is a further function of the revising.

14. The method of claim 1, further comprising providing at least one support service for at least one of creating, integrating, hosting, maintaining, and deploying computer-readable program code in the computer system, wherein the computer-readable program code in combination with the computer system is configured to implement the receiving, selecting, further selecting, provisioning, configuring, evaluating, deriving, ranking, further ranking, revising, repeating, and identifying.

15. A computer program product, comprising a computer-readable hardware storage device having a computer-readable program code stored therein, said program code configured to be executed by a processor of a computer system to implement a method for optimizing a cloud-computing environment, the method comprising:
the processor receiving extrinsic data that describes a set of virtual resources of the cloud-computing environment;
the processor selecting a set of candidate resource configurations, wherein every virtual resource of the set of virtual resources is associated with a plurality of candidate resource configurations of the set of candidate resource configurations in a one-to-many relationship;
the processor further selecting a set of candidate environment configurations, wherein each candidate environment configuration of the set of candidate environment configurations comprises at least one candidate resource configuration of the set of candidate resource configurations;
the processor provisioning a virtual test environment, wherein the virtual test environment simulates the cloud-computing environment, and wherein the virtual test environment comprises a virtual representation of each virtual resource of the set of virtual resources of the cloud-computing environment;
the processor configuring the virtual test environment by successively loading the virtual test environment with combinations of a configuration of at least two candidate environment configurations of the set of candidate environment configurations and a configuration of at least two candidate resource configurations of the set of candidate resource configurations, wherein the at least two candidate resource configurations are associated with a same tested resource of the set of virtual resources;
the processor evaluating a first resource-fitness characteristic of a first loaded resource configuration of the at least two candidate resource configurations, wherein the first loaded resource configuration is associated with the same tested resource of the set of virtual resources, and wherein the first resource-fitness characteristic is assigned a value as a function of an operation of the same tested resource within the virtual test environment while the virtual test environment is loaded with the first loaded resource configuration;
the processor deriving a value of an environment-fitness characteristic of a first loaded environment configuration of the at least two candidate environment configurations as a function of an operation of the virtual test environment while the virtual test environment is loaded with the first loaded environment configuration;
the processor ranking the at least two candidate resource configurations as a function of the evaluating and of the deriving;
the processor further ranking the at least two candidate environment configurations as a function of the evaluating and of the deriving;
the processor revising at least one candidate resource configuration of the set of candidate resource configurations and at least one candidate environment configuration of the set of candidate environment configurations as a function of the ranking and of the further ranking;
the processor repeating the configuring, the evaluating, the deriving, the ranking, the further ranking, and the revising until a termination condition is satisfied; and
the processor identifying an optimal environment configuration as a function of the further ranking.

16. The computer program product of claim 15, wherein a first virtual resource of the set of virtual resources comprises a first set of functional blocks, wherein a first functional block of the first set of functional blocks comprises a first set of configurable parameters, and wherein a first configuration of the first virtual resource comprises a first set of values of the first set of configurable parameters.

17. The computer program product of claim 15, wherein the termination condition is satisfied when one repetition of the configuring, the evaluating, the deriving, the ranking, the further ranking, and the revising does not substantially alter the set of candidate resource configurations and the set of candidate environment configurations, wherein the substantially altering comprises producing a difference in one or more values of one or more configurable parameters comprised by the set of candidate resource configurations or by the set of set of candidate environment configurations, such that the produced difference exceeds a predetermined threshold level.

18. A computer system comprising a processor, a memory coupled to said processor, and a computer-readable hardware storage device coupled to said processor, said storage device containing program code configured to be run by said processor via the memory to implement a method for optimizing a cloud-computing environment, the method comprising:

the processor receiving extrinsic data that describes a set of virtual resources of the cloud-computing environment;

the processor selecting a set of candidate resource configurations, wherein every virtual resource of the set of virtual resources is associated with a plurality of candidate resource configurations of the set of candidate resource configurations in a one-to-many relationship;

the processor further selecting a set of candidate environment configurations, wherein each candidate environment configuration of the set of candidate environment configurations comprises at least one candidate resource configuration of the set of candidate resource configurations;

the processor provisioning a virtual test environment, wherein the virtual test environment simulates the cloud-computing environment, and wherein the virtual test environment comprises a virtual representation of each virtual resource of the set of virtual resources of the cloud-computing environment;

the processor configuring the virtual test environment by successively loading the virtual test environment with combinations of a configuration of at least two candidate environment configurations of the set of candidate environment configurations and a configuration of at least two candidate resource configurations of the set of candidate resource configurations, wherein the at least two candidate resource configurations are associated with a same tested resource of the set of virtual resources;

the processor evaluating a first resource-fitness characteristic of a first loaded resource configuration of the at least two candidate resource configurations, wherein the first loaded resource configuration is associated with the same tested resource of the set of virtual resources, and wherein the first resource-fitness characteristic is assigned a value as a function of an operation of the same tested resource within the virtual test environment while the virtual test environment is loaded with the first loaded resource configuration;

the processor deriving a value of an environment-fitness characteristic of a first loaded environment configuration of the at least two candidate environment configurations as a function of an operation of the virtual test environment while the virtual test environment is loaded with the first loaded environment configuration;

the processor ranking the at least two candidate resource configurations as a function of the evaluating and of the deriving;

the processor further ranking the at least two candidate environment configurations as a function of the evaluating and of the deriving;

the processor revising at least one candidate resource configuration of the set of candidate resource configurations and at least one candidate environment configuration of the set of candidate environment configurations as a function of the ranking and of the further ranking;

the processor repeating the configuring, the evaluating, the deriving, the ranking, the further ranking, and the revising until a termination condition is satisfied; and the processor identifying an optimal environment configuration as a function of the further ranking.

19. The computer system of claim 18, wherein a first virtual resource of the set of virtual resources comprises a first set of functional blocks, wherein a first functional block of the first set of functional blocks comprises a first set of configurable parameters, and wherein a first configuration of the first virtual resource comprises a first set of values of the first set of configurable parameters.

20. The computer system of claim 18, wherein the termination condition is satisfied when one repetition of the configuring, the evaluating, the deriving, the ranking, the further ranking, and the revising does not substantially alter the set of candidate resource configurations and the set of candidate environment configurations, wherein the substantially altering comprises producing a difference in one or more values of one or more configurable parameters comprised by the set of candidate resource configurations or by the set of set of candidate environment configurations, such that the produced difference exceeds a predetermined threshold level.

* * * * *